United States Patent
Zhou

(10) Patent No.: US 11,477,822 B2
(45) Date of Patent: Oct. 18, 2022

(54) METHOD AND DEVICE FOR NOTIFYING CHANNEL OCCUPATION TIME, AND BASE STATION AND USER EQUIPMENT

(71) Applicant: BEIJING UNISOC COMMUNICATIONS TECHNOLOGY CO., LTD., Beijing (CN)

(72) Inventor: Huan Zhou, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 2 days.

(21) Appl. No.: 16/969,544

(22) PCT Filed: Apr. 2, 2019

(86) PCT No.: PCT/CN2019/080926
§ 371 (c)(1),
(2) Date: Aug. 12, 2020

(87) PCT Pub. No.: WO2019/192449
PCT Pub. Date: Oct. 10, 2019

(65) Prior Publication Data
US 2021/0007143 A1    Jan. 7, 2021

(30) Foreign Application Priority Data
Apr. 3, 2018    (CN) .......................... 201810290152.8

(51) Int. Cl.
*H04W 4/00*    (2018.01)
*H04W 74/08*    (2009.01)
(Continued)

(52) U.S. Cl.
CPC ....... *H04W 74/0816* (2013.01); *H04W 16/14* (2013.01); *H04W 72/042* (2013.01); *H04W 72/0446* (2013.01); *H04W 74/006* (2013.01)

(58) Field of Classification Search
None
See application file for complete search history.

(56) References Cited

U.S. PATENT DOCUMENTS

2017/0048879 A1    2/2017    Zhang et al.
2021/0368387 A1*   11/2021   Ahn ....................... H04W 16/14
2021/0368541 A1*   11/2021   Hedayat ............ H04W 72/0446

FOREIGN PATENT DOCUMENTS

CN          105230102 A      1/2016
CN          105636178 A      6/2016
WO       WO-2017136265 A1    8/2017

OTHER PUBLICATIONS

International Search Report (in English and Chinese) and Written Opinion of the International Searching Authority (in Chinese), issued in PCTCN2019/080926, dated Jun. 13, 2019; ISA/CN.

* cited by examiner

*Primary Examiner* — Clemence S Han
(74) *Attorney, Agent, or Firm* — Harness, Dickey & Pierce, P.L.C.

(57) ABSTRACT

A method and a device for notifying channel occupation time, a base station and a user equipment. The method which applies to a base station includes: in an unlicensed spectrum, performing LBT and channel access; and when a channel is accessed successfully, sending a time slot format information which indicates one or more time slots of one or more cells to a UE through a PDCCH. The method which applies to a user equipment includes: in an unlicensed spectrum, receiving time slot format information, sent by a base station via a PDCCH after channel access is successfully com- (Continued)

pleted, indicating one or more time slots of one or more cells; acquiring channel occupation information and channel release information according to the time slot format information; and according to the channel occupation information and the channel release information, performing downlink reception, uplink transmission or channel access in symbols of each time slot.

19 Claims, 3 Drawing Sheets

(51) Int. Cl.
*H04W 16/14* (2009.01)
*H04W 72/04* (2009.01)
*H04W 74/00* (2009.01)

METHOD AND DEVICE FOR NOTIFYING CHANNEL OCCUPATION TIME, AND BASE STATION AND USER EQUIPMENT

CROSS-REFERENCE TO RELATED APPLICATIONS

This application is the national phase of International Application No. PCT/CN2019/080926, filed on Apr. 2, 2019, which claims priority to Chinese Patent Application No. 201810290152.8, filed on Apr. 3, 2019, and entitled "METHOD AND DEVICE FOR NOTIFYING CHANNEL OCCUPATION TIME, AND BASE STATION AND USER EQUIPMENT", the entire disclosures of both of the above applications are incorporated herein by reference.

TECHNICAL FIELD

The present disclosure generally relates to wireless communication technology field, and more particularly, to a method and a device for notifying channel occupation time, a base station and a user equipment.

BACKGROUND

In a 3rd Generation Partnership Project (3GPP) New Radio (NR) system, a radio frame with a time domain length of 10 ms is divided into 10 subframes with a same length of 1 ms, and each subframe may include multiple time slots according to according to different subcarrier intervals. Each time slot includes a certain number of symbols, and a number of symbols is determined by Cyclic Prefix (CP) type. Compared with a Long Term Evolution (LTE) special subframe structure which has a fixed 10 types of downlink, Guard period (GP) and uplink symbols, Slot Format (SF) is introduced in a NR system, wherein each time slot includes a certain number of downlink, flexible (denoted by 'X') and uplink symbols. The SF may be configured in three ways: semi-static cell-level Radio Resource Control (RRC) signaling configuration; User Equipment (UE) specific RRC signaling configuration; and dynamically sending Slot Format Indication (SFI) to a group of UEs through a Physical Downlink Control Channel (PDCCH), that is, dynamic slot format information. The SFI information carried on the PDCCH may indicate format of one or more time slots on one or more carriers. After the SFI is detected, the UE obtains an index information and the index information points to a UE-specific table. The UE specific table tells which symbols in the time slot are uplink (UL), which symbols are downlink (DL), and which symbols are "flexible". The UE-specific table is configured and combined in a single-slot-format table. The single-slot-format table includes all time slot formats (less than 256) supported in NR. It has been determined that time slot format in the single-slot-format table (as shown in Table 1) includes at most two downlink/uplink (D/U) switching points in each time slot.

TABLE 1

| format | \multicolumn{14}{c}{symbol number in a time slot} |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |

TABLE 1-continued

| | symbol number in a time slot | | | | | | | | | | | | | |
|---|---|---|---|---|---|---|---|---|---|---|---|---|---|---|
| format | 0 | 1 | 2 | 3 | 4 | 5 | 6 | 7 | 8 | 9 | 10 | 11 | 12 | 13 |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | D | D | D | D | D | D | D |
| 56-255 | | | | | | Reserved | | | | | | | | |

Details are described as follows.

1. There is no switching point in a time slot: 14 downlink symbols (as shown in FIG. 1), or 14 Unknown symbols (as shown in FIG. 3), or 14 uplink symbols (as shown in FIG. 2).

2. There is one D/U switching point in a time slot (as shown in FIG. 4): a time slot starts with zero or more DL symbols and ends with zero or more UL symbols, with Unknown symbols in the middle which has at least one Unknown symbol, and at least one DL symbol or at least one UL symbol.

3. There is two D/U switching points in a time slot (as shown in FIG. 5): first seven symbols of the time slot start with zero or more DL symbols and end with at least one UL symbol in Symbol 6, the middle of which is Unknown symbols; and last seven symbols start with zero or more DL symbols, end with zero or more UL symbols, and has zero or more Unknown symbols in the middle.

3GPP standards organizations are researching on how to deploy NR networks on unlicensed spectrum, so as to achieve purposes of fair and effective use of unlicensed spectrum and improve data transmission rate in a NR system. There are three ways to use unlicensed spectrum in a NR system: first, a NR cell in an unlicensed spectrum is used as a primary cell; second, a UE accesses a NR cell in an unlicensed spectrum through a LTE cell; and third, a UE accesses a NR cell in an unlicensed spectrum through a NR cell. In the last two ways, licensed spectrum and unlicensed spectrum can be combined in a way that is similar to carrier aggregation, that is, a UE and a gNB (which means a 5G base station) may work in both licensed spectrum and unlicensed spectrum.

In a 3GPP LTE system, a Listen-Before-Talk (LBT) process is used to achieve coexistence of Licensed Assisted Access (LAA) of different operators and other systems in unlicensed spectrum. In the LBT process, nodes in the unlicensed spectrum determines whether a current channel is available or not before data transmission through Clear Channel Assessment (CCA). Thus energy detection is used to determine whether the channel is occupied or not in any LBT process. Some regional regulations stipulate an energy detection threshold. If energy received by a node is higher than this threshold, the channel is considered as busy. There are two channel access processes supported in LTE License Assisted Access (LAA) downlink transmission: a channel access process (that is also called Cat 4 channel access) that needs to send Physical Downlink Shared Channel (PDSCH)/PDCCH/enhanced PDCCH (EPDCCH), and a channel access process (that is also called Cat 2 channel access) that needs to send discovery reference signals. Similarly, these two channel access processes are also supported in LAA uplink transmission, which are called Type 1 channel access and Type 2 channel access. Type 1 channel access is based on Cat 4 channel access, and Type 2 channel access is based on a fixed time length (Cat 2) channel access which has at least 25 us of LBT before transmission.

Type 1: a channel is detected to determine if it is in an idle state during a defer duration $T_d$, the value of N in Step 4 is 0, and N increases with a sensing slot duration. Steps in Type 1 channel access process are described as follows.

Step 1: set $N=N_{init}$, where $N_{init}$ is a random number uniformly distributed between 0 and $CW_p$, and go to step 4.

Step 2: if N>0 and eNB/gNB chooses to decrement a counter, set N=N−1.

Step 3: sense the channel for an additional sensing slot duration, and if the additional sensing slot duration is idle, go to step 4; otherwise, go to step 5.

Step 4: if N=0, stop; otherwise, go to Step 2.

Step 5: sense the channel for an additional defer duration $T_d$ until either a busy sensing slot is detected within the additional defer duration $T_d$ or all sensing slots of the additional defer duration $T_d$ are detected to be idle.

Step 6: if the channel is sensed to be idle during all the sensing slot durations of the additional defer duration $T_d$, go to step 4; otherwise, go to step 5.

In the channel access process described above, different Maximum Channel Occupy Time (MCOT) is required according to different channel access priorities. The MCOT which means a maximum available time period of the channel, is shown as $T_{mcot,p}$ in Table 2.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |

TABLE 2-continued

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Type 2: if the channel is detected for at least $T_{drs}$=25 us, average energy is lower $X_{Thresh}$, and transmission time is less than 1 ms, downlink or uplink data can be sent on a channel transmitted by an unauthorized cell.

The two processes described above may be referred to as channel access Type 1 and Type 2 hereinafter.

In an unlicensed spectrum, after finishing LBT and accessing a channel successfully, a base station cannot notify a UE of the channel occupation situation, thus it cannot share the channel with the UE effectively.

SUMMARY

Embodiments of the present disclosure provide a method and a device for notifying channel occupation time, a base station and a user equipment, wherein a time slot format information is sent through a PDCCH, so as to notify a UE of the channel occupation situation, thereby sharing the channel with the UE effectively and improving channel occupation rate.

In an embodiment of the present disclosure, a method for notifying channel occupation time is provided, wherein the method applies to a base station, including: in an unlicensed spectrum, performing Listen-Before-Talk (LBT) and conducting channel access; and when a channel is accessed successfully, sending a time slot format information which indicates one or more time slots of one or more cells to a UE through a PDCCH, so as to notify the UE that the base station accesses the channel and occupies the channel.

In some embodiments, sending a time slot format information which indicates one or more time slots of one or more cells to a UE through a PDCCH includes: sending the time slot format information which indicates one or more time slots of one or more cells to the UE through Downlink Control Information (DCI) 2-0 of the PDCCH.

In some embodiments, performing Listen-Before-Talk (LBT) and conducting channel access includes: conducting channel access according to Type 1.

In some embodiments, if a transmission period of the PDCCH or an absolute me corresponding to a number of tune slot formats indicating a corresponding cell in the PDCCH is less than or equal to a current maximum channel occupation time, all the time slot format information in the PDCCH is channel occupation information.

In some embodiments, if the transmission period of the PDCCH or the absolute time corresponding to the number of time slot formats indicating a corresponding cell in the PDCCH is greater than the current maximum channel occupation time, the time slot format information in the PDCCH includes channel occupation information and channel release information.

In some embodiments, the channel occupation information includes: when an absolute time corresponding to a number of all time slot formats indicating a corresponding cell in the PDCCH is less than or equal to the maximum channel occupation time, or an absolute time corresponding to a number of partial time slot formats indicating a corresponding cell is less than or equal to the maximum channel occupation time, using a specific time slot format to indicate it is within the maximum channel occupation time or channel occupation.

In some embodiments, using a specific time slot format to indicate it is within the maximum channel occupation time or channel occupation includes: using all D to indicate that the channel is occupied in an entire time slot, the base station sends downlink data in the entire time slot, and the UE needs to receive; using all U to indicate that the channel is occupied in the entire time slot and the UE can send uplink data in the entire time slot; in a switching point, using D+X+U or X+U to indicate that the channel is occupied in the entire time slot, wherein the UE can send uplink data on an UL symbol, send downlink data on a DL symbol, and perform channel access on an X symbol; and in two switching points, indicating that the channel is occupied in the entire time slot, wherein the UE can send uplink data on an UL symbol, send downlink data on a DL symbol, and perform channel access on an X symbol.

In some embodiments, the channel release information includes: when a length of the absolute time corresponding to the number of slot formats in the PDCCH indicating a corresponding cell exceeds the maximum channel occupation time, using a specific time slot format to indicate that the maximum channel occupation time is exceeded or channel release.

In some embodiments, using a specific time slot format to indicate that the maximum channel occupation time is exceeded or channel release includes: using all X to indicate that the maximum channel occupation time is exceeded or channel release in the entire time slot; using DL+X to indicate that the maximum channel occupation time is exceeded or channel release in some time slots; and using all X to indicate that a corresponding cell has not been accessed successfully or the channel is released.

In an embodiment of the present disclosure, a method for notifying channel occupation time is provided, wherein the method applies to a user equipment, including: in an unlicensed spectrum, receiving a time slot format information sent by a base station through a PDCCH after the base station accesses a channel successfully, wherein the time slot format information indicates one or more time slots of one or more cells; according to the slot format information, acquiring channel occupation information and channel release information; and according to the channel occupation information and the channel release information, performing downlink reception, uplink transmission or channel access in symbols of each time slot.

In some embodiments, according to the slot format information, acquiring channel occupation information and channel release information includes: acquiring at least one of the following information: whether the base station accesses the channel successfully or not, a length of channel occupation time, a timing for channel release, and an allocation information of downlink symbols and uplink symbols in each time slot during the channel occupation time.

In some embodiments, according to the channel occupation information and the channel release information, performing downlink reception, uplink transmission or channel access in symbols of each time slot includes: receiving a downlink signal or channel in the downlink symbols indicating time slot format.

In some embodiments, according to the channel occupation information and the channel release information, performing downlink reception, uplink transmission or channel access in symbols of each time slot includes: in the uplink symbols indicating time slot format, performing channel access according to Type 2 channel access process, or sending an uplink channel or signal directly without performing LBT.

In some embodiments, according to the channel occupation information and the channel release information, performing downlink reception, uplink transmission or channel access in symbols of each time slot includes: in the uplink symbols and flexible symbols indicating time slot format, performing channel access according to Type 2 channel access process, or sending a dynamic uplink channel or signal triggered by a physical layer signaling directly without performing LBT.

In an embodiment of the present disclosure, a device for notifying channel occupation time is provided, wherein the device is located at a base station, including: an access unit, configured to perform LBT and conduct channel access in an unlicensed spectrum; and a transmission unit, when a channel is accessed successfully, configured to send a slot format information which indicates one or more time slots of one or more cells to a UE through a PDCCH, so as to notify the UE that the base station accesses the channel and occupies the channel.

In some embodiments, the transmission unit is configured to send the slot format information which indicates one or more time slots of one or more cells to the UE through DCI 2-0 of the PDCCH.

In some embodiments, the access unit performs channel access according to Type 1.

In some embodiments, if a transmission period of the PDCCH or an absolute me corresponding to a number of tune slot formats indicating a corresponding cell in the PDCCH is less than or equal to a current maximum channel occupation time, all the time slot format information in the PDCCH is channel occupation information.

In some embodiments, if the transmission period of the PDCCH or the absolute time corresponding to the number of time slot formats indicating a corresponding cell in the PDCCH is greater than the current maximum channel occupation time, the time slot format information in the PDCCH includes channel occupation information and channel release information.

In some embodiments, the channel occupation information includes: when an absolute time corresponding to a number of all time slot formats indicating a corresponding cell in the PDCCH is less than or equal to the maximum channel occupation time, or an absolute time corresponding to a number of partial time slot formats indicating a corresponding cell is less than or equal to the maximum channel occupation time, using a specific time slot format to indicate it is within the maximum channel occupation time or channel occupation.

In some embodiments, using a specific time slot format to indicate it is within the maximum channel occupation time or channel occupation includes: using all D to indicate that the channel is occupied in an entire time slot, the base station sends downlink data in the entire time slot, and the UE needs to receive; using all U to indicate that the channel is occupied in the entire time slot and the UE can send uplink data in the entire time slot; in a switching point, using D+X+U or X+U to indicate that the channel is occupied in the entire time slot, wherein the UE can send uplink data on an UL symbol, send downlink data on a DL symbol, and perform channel access on an X symbol; and in two switching points, indicating that the channel is occupied in the entire time slot, wherein the UE can send uplink data on an UL symbol, send downlink data on a DL symbol, and perform channel access on an X symbol.

In some embodiments, the channel release information includes: when a length of the absolute time corresponding to the number of slot formats in the PDCCH indicating a corresponding cell exceeds the maximum channel occupation time, using a specific time slot format to indicate that the maximum channel occupation time is exceeded or channel release.

In some embodiments, using a specific time slot format to indicate that the maximum channel occupation time is exceeded or channel release includes: using all X to indicate that the maximum channel occupation time is exceeded or channel release in the entire time slot; using DL+X to indicate that the maximum channel occupation time is exceeded or channel release in some time slots; and using all X to indicate that a corresponding cell has not been accessed successfully or the channel is released.

In an embodiment of the present disclosure, a device for notifying channel occupation time is provided, wherein the device is located at a user equipment, including: a reception unit, configured to receive a slot format information which is sent by a base station through a PDCCH after accessing a channel successfully in an unlicensed spectrum, wherein the slot format information indicates one or more time slots of one or more cells; an acquiring unit, configured to acquire channel occupation information and channel release information according to the time slot format information; and a processing unit, configured to perform downlink reception, uplink transmission or channel access in symbols of each time slot, according to the channel occupation information and the channel release information.

In some embodiments, the acquiring unit acquires at least one of the following information: whether the base station accesses the channel successfully or not, a length of channel occupation time, a timing for channel release, and an allocation information of downlink symbols and uplink symbols in each time slot during the channel occupation time.

In some embodiments, the processing unit receives a downlink signal or channel in the downlink symbols indicating time slot format.

In some embodiments, in the uplink symbols indicating time slot format, the processing unit performs channel access according to Type 2 channel access process, or sends an uplink channel or signal directly without performing LBT.

In some embodiments, in the uplink symbols and flexible symbols indicating time slot format, the processing unit performs channel access according to Type 2 channel access process, or sends a dynamic uplink channel or signal triggered by a physical layer signaling directly without performing LBT.

In an embodiment of the present disclosure, a base station having a device for notifying channel occupation time described above is provided, wherein the device is located at the base station.

In an embodiment of the present disclosure, a user equipment having a device for notifying channel occupation time described above is provided, wherein the device is located at the user equipment.

According to embodiments of the present disclosure described above, a method and a device for notifying channel occupation time, a base station and a user equipment are provided. After accessing a channel successfully, the base station sends a time slot format information through a PDCCH to the UE, so as to notify the UE of the channel occupation situation, thereby sharing the channel with the UE effectively and improving channel occupation rate and system performance.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall be within the protection scope of the present invention.

Figure 1:
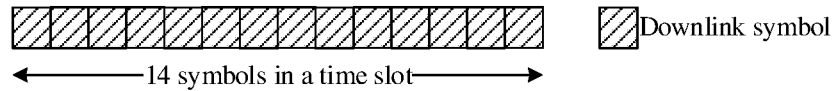
FIGS. 1 to 5 are exemplary settings of 14 symbols in a time slot according to prior art.
Figure 2:
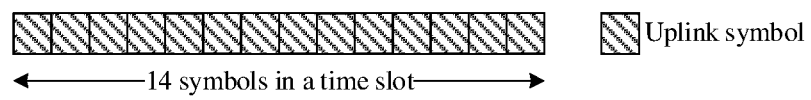
Figure 3:
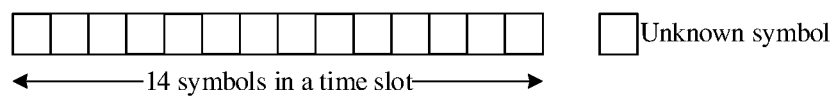
Figure 4:
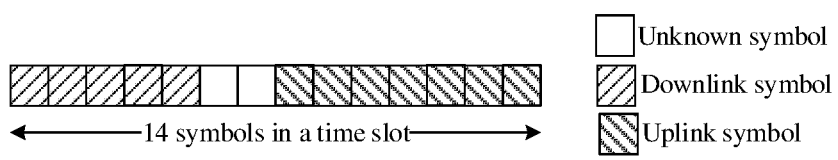
Figure 5:
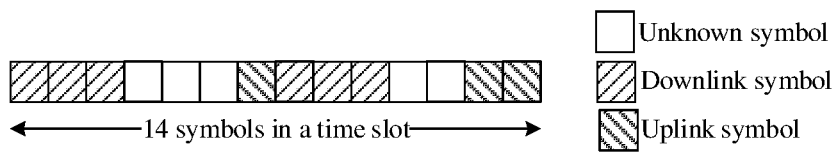
Figure 6:
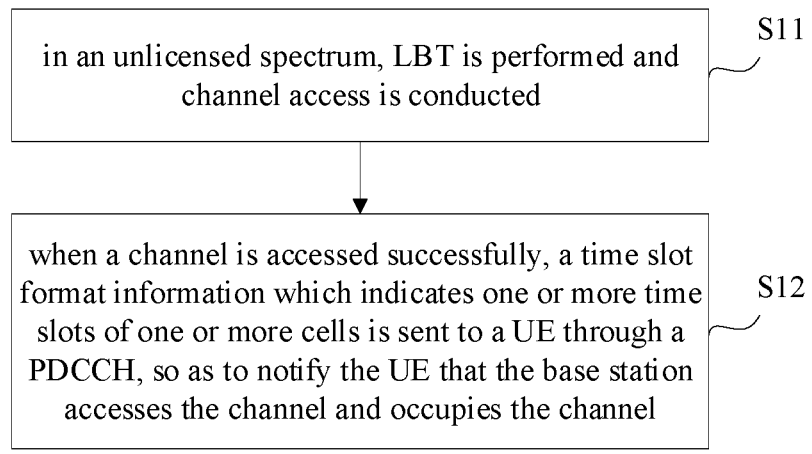
FIG. 6 schematically illustrates a flow chart of a method for notifying channel occupation time according to an embodiment.

Embodiments of the present disclosure provide a method for notifying channel occupation time, wherein the method applies to a base station. Referring to FIG. 6, the method includes S11 and S12.

S11: in an unlicensed spectrum, the base station performs Listen-Before-Talk (LBT) and conducts channel access.

First, a search space carrying DCI 2-0 in a PDCCH is sent according to a high-level signaling configuration, which includes a transmission period and an offset. A UE periodically monitors the PDCCH according to the configuration. the DCI 2-0 may include time slot formats of multiple slots of multiple cells, wherein a number of cells and a number of slots in each cell are configured by the high-level signaling.

S12: when a channel is accessed successfully, the base station sends a time slot format information which indicates one or more time slots of one or more cells to the UE through the PDCCH, so as to notify the UE that the base station accesses the channel and occupies the channel.

Specifically, the base station sends the time slot format information which indicates one or more time slots of one or more cells to the UE through DCI 2-0 of the PDCCH.

According to the embodiment of the present disclosure described above, a method for notifying channel occupation time is provided. The base station sends the time slot format information through the PDCCH to the UE, so as to notify the UE of the channel occupation situation. Therefore, after accessing the channel successfully, the base station can share the channel with the UE effectively, thereby improving channel occupation rate and system performance.

In some embodiments, only after a gNB access the channel according to Type 1, it can send the time slot format information which indicates one or more time slots of one or more cells to the UE.

When the gNB uses a Type 1 channel to access one serving cell or a plurality of serving cells, duration of Maximum Channel Occupy Time (MCOT) is determined according to channel access priority class, and transmission period of the PDCCH is configured semi-statically.

In some embodiments, if the transmission period of the PDCCH or an absolute time corresponding to a number of time slot formats indicating a corresponding cell in the PDCCH is less than or equal to a current MCOT, all the time slot format information in the PDCCH is channel occupation information.

In some embodiments, if the transmission period of the PDCCH or the absolute time corresponding to the number of time slot formats indicating a corresponding cell in the PDCCH is greater than the current MCOT, the time slot format information in the PDCCH includes channel occupation information and channel release information.

In some embodiments, the channel occupation information includes: when an absolute time corresponding to a number of all time slot formats indicating a corresponding cell in the PDCCH is less than or equal to the MCOT or an absolute time corresponding to a number of partial time slot formats indicating a corresponding cell is less than or equal to the MCOT, using a specific time slot format to indicate it is within the maximum channel occupation time or channel occupation.

In some embodiments, all D (format 0 in Table 1) is used to indicate that the channel occupied in an entire time slot, the gNB sends downlink data in the entire time slot, and the UE needs to receive; all U (format 1 in Table 1) is used to indicate that the channel is occupied in the entire time slot and the UE can send uplink data in the entire time slot; in a switching point, D+X+U (format 19-45 in Table 1) or X+U (format 8-15 in Table 1) is used to indicate that the channel is occupied in the entire time slot, wherein the UE can send uplink data on an UL symbol, send downlink data on a DL symbol and perform channel access on an X symbol; and in two switching points (format 46-55 in Table 1), it is indicated that the channel is occupied in the entire time slot, wherein the UE can send uplink data on an UL symbol, send downlink data on a DL symbol, and perform channel access on an X symbol.

In some embodiments, the channel release information includes: when a length of the absolute time corresponding to the number of time slot formats in the PDCCH indicating a corresponding cell exceeds the maximum channel occupation time, using a specific time slot format to indicate that the MCOT is exceeded or channel release.

In some embodiments, all X (for at 2 in Table 1) is used to indicate that the MCOT is exceeded or channel release in the entire time slot; and DL+X (format 3-7, 16, 17 and 18 in Table 1) is used to indicate that the MCOT is exceeded or channel release in some time slots.

When the time slot format of the PDCCH indicates a plurality of serving cells, if some of the serving cells are not accessed successfully, a specific time slot format is used to indicate no channel occupation, the MCOT is exceeded, or channel release. Specifically, all X (format 2 in Table 1) is used to indicate that a corresponding serving cell has not been accessed successfully or the channel is released.

Figure 7:
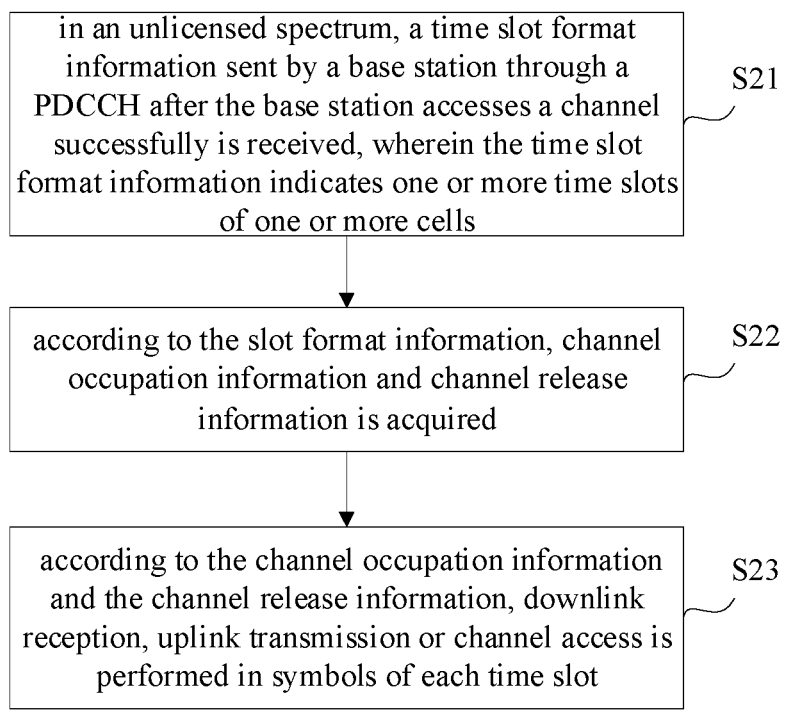
FIG. 7 schematically illustrates a flow chart of a method for notifying channel occupation time according to another embodiment.

In an embodiment of the present disclosure, a method for notifying channel occupation time is provided, wherein the method applies to a user equipment. Referring to FIG. 7, the method includes S21, S22 and S23.

S21: in an unlicensed spectrum, the UE receives a time slot format information sent by a base station through a PDCCH after the base station accesses a channel successfully, wherein the time slot format information indicates one or more time slots of one or more cells.

Specifically, the UE receives the time slot format information sent by the base station through DCI 2-0 of the PDCCH, wherein the time slot format information indicates one or more time slots of one or more cells.

S22: according to the slot format information, the UE acquires channel occupation information and channel release information.

Specifically, after receiving the DCI 2-0 of the PDCCH, the UE acquires the channel occupation information and the channel release information according to the slot format information and acquires at least one of the following information: whether the gNB accesses the channel successfully or not, a length of channel occupation time, a timing for channel release, and an allocation information of downlink symbols and uplink symbols in each time slot during the channel occupation time.

S23: according to the channel occupation information and the channel release information, the UE performs downlink reception, uplink transmission or channel access in symbols of each time slot.

According to the embodiment of the present disclosure described above, a method for notifying channel occupation time is provided. After accessing the channel successfully, the base station sends the time slot format information through the PDCCH to the UE, so as to notify the UE the channel occupation information and the channel release information. According to the channel occupation information and the channel release information, the UE performs downlink reception, uplink transmission or channel access in symbols of each time slot, thereby sharing the channel with the UE effectively and improving channel occupation rate and system performance.

In some embodiments, according to the channel occupation information and the channel release information, the UE performing downlink reception, uplink transmission or channel access in symbols of each time slot includes: in the downlink symbols indicating time slot format, the UE receives a downlink signal or channel; in the uplink symbols indicating the slot format, the UE performs channel access according to Type 2 channel access process (short LBT), or sending an uplink channel or signal directly without performing LBT, wherein the uplink channel or signal may be a periodic signal, such as a periodic Sounding Reference Signal (SRS), a Physical Uplink Control Channel (PUCCH), a configured uplink authorized transmission, or it may also be an uplink channel configured by a high-level signaling, such as a Physical Random-Access Channel (PRACH); and in the uplink symbols and flexible symbols indicating the slot format, the UE performs channel access according to Type 2 channel access process (short LBT), or sending a dynamic uplink channel or signal triggered by a physical layer signaling directly without performing LBT, for example, a nonperiodic SRS, a dynamic Physical Uplink Shared Channel (PUSCH).

Figure 8:
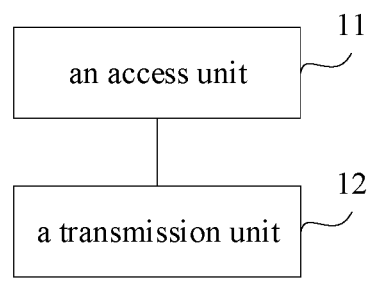
FIG. 8 schematically illustrates a structural diagram of a device for notifying channel occupation time according to an embodiment.

In an embodiment of the present disclosure, a device for notifying channel occupation time is provided, wherein the device is located at a base station. Referring to FIG. 8, the device includes:

an access unit 11, configured to perform LBT and conduct channel access in an unlicensed spectrum; and a transmission unit 12, when a channel is accessed successfully, configured to send a slot format information which indicates one or more time slots of one or more cells to a UE through a PDCCH, so as to notify the UE that the base station accesses the channel and occupies the channel.

According to the embodiment of the present disclosure described above, a device for notifying channel occupation time is provided. The base station sends the time slot format information through the PDCCH to the UE, so as to notify the UE of the channel occupation situation. Therefore, after accessing the channel successfully, the base station can share the channel with the UE effectively, thereby improving channel occupation rate and system performance.

In some embodiments, the transmission unit 12 is configured to send the slot format information which indicates one or more time slots of one or more cells to the UE through DCI 2-0 of the PDCCH.

In some embodiments, the access unit 11 performs channel access according to Type 1.

In some embodiments, if a transmission period of the PDCCH or an absolute time corresponding to a number of time slot formats indicating a corresponding cell in the PDCCH is less than or equal to a current maximum channel occupation time, all the time slot format information in the PDCCH is channel occupation information.

In some embodiments, if the transmission period of the PDCCH or the absolute time corresponding to the number of time slot formats indicating a corresponding cell in the PDCCH is greater than the current maximum channel occupation time, the time slot format information in the PDCCH includes channel occupation information and channel release information.

In some embodiments, the channel occupation information includes: when an absolute time corresponding to a number of all time slot formats indicating a corresponding cell in the PDCCH is less than or equal to the maximum channel occupation time, or an absolute time corresponding to a number of partial time slot formats indicating a corresponding cell is less than or equal to the maximum channel occupation time, using a specific time slot format to indicate it is within the maximum channel occupation time or channel occupation.

In some embodiments, using a specific time slot format to indicate it is within the maximum channel occupation time or channel occupation includes: using all D to indicate that the channel is occupied in an entire time slot, the base station sends downlink data in the entire time slot, and the UE needs to receive; using all U to indicate that the channel is occupied in the entire time slot and the UE can send uplink data in the entire time slot; in a switching point, using D+X+U or X+U to indicate that the channel is occupied in the entire time slot, wherein the UE can send uplink data on an UL symbol, send downlink data on a DL symbol, and perform channel access on an X symbol; and in two switching points, indicating that the channel is occupied in the entire time slot, wherein the UE can send uplink data on an UL symbol, send downlink data on a DL symbol, and perform channel access on an X symbol.

In some embodiments, the channel release information includes: when a length of the absolute time corresponding to the number of time slot formats in the PDCCH indicating a corresponding cell exceeds the maximum channel occupation time, using a specific time slot format to indicate that the maximum channel occupation time is exceeded or channel release.

In some embodiments, using a specific time slot format to indicate that the maximum channel occupation time is exceeded or channel release includes: using all X to indicate that the maximum channel occupation time is exceeded or channel release in the entire time slot; using DL+X to indicate that the maximum channel occupation time is exceeded or channel release in some time slots; and using all X to indicate that a corresponding cell has not been accessed successfully or the channel is released.

The device provided in the embodiments described above can be used to execute the technical solutions provided in the above method embodiments which applies to a base station. The implementation principles and technical effects are similar, which will not be described in detail herein again.

Figure 9:
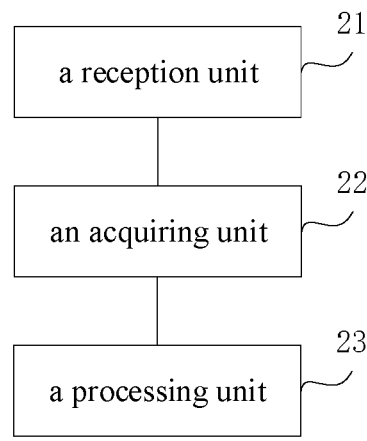
FIG. 9 schematically illustrates a structural diagram of a device for notifying channel occupation time according to another embodiment.

In an embodiment of the present disclosure, a device for notifying channel occupation time is provided, wherein the device is located at a user equipment. Referring to FIG. 9, the device includes:

a reception unit 21, configured to receive a slot format information which is sent by a base station through a PDCCH after accessing a channel successfully in an unlicensed spectrum, wherein the slot format information indicates one or more time slots of one or more cells;

an acquiring unit 22, configured to acquire channel occupation information and channel release information according to the time slot format information; and a processing unit 23, configured to perform downlink reception, uplink transmission or channel access in symbols of each time slot, according to the channel occupation information and the channel release information.

According to the embodiment of the present disclosure described above, a device for notifying channel occupation time is provided. After accessing the channel successfully, the base station sends the time slot format information through the PDCCH to the UE, so as to notify the UE the channel occupation information and the channel release information. According to the channel occupation information and the channel release information, the UE performs downlink reception, uplink transmission or channel access in symbols of each time slot, thereby sharing the channel with the UE effectively and improving channel occupation rate and system performance.

In some embodiments, the acquiring unit 22 acquires at least one of the following information: whether the base station accesses the channel successfully or not, a length of channel occupation time, a timing for channel release, and an allocation information of downlink symbols and uplink symbols in each time slot during the channel occupation time.

In some embodiments, the processing unit 23 receives a downlink signal or channel in the downlink symbols indicating time slot format.

In some embodiments, in the uplink symbols indicating the slot format, the processing unit 23 performs channel access according to Type 2 channel access process, or sends an uplink channel or signal directly without performing LBT.

In some embodiments, in the uplink symbols and flexible symbols indicating the slot format, the processing unit 23 performs channel access according to Type 2 channel access process, or sends a dynamic uplink channel or signal triggered by a physical layer signaling directly without performing LBT.

The device provided in the embodiments described above can be used to execute the technical solutions provided in the above method embodiments which applies to a user equipment. The implementation principles and technical effects are similar, which will not be described in detail herein again.

In an embodiment of the present disclosure, a base station having a device for notifying channel occupation time described above is provided, wherein the device is located at the base station.

In an embodiment of the present disclosure, a user equipment having a device for notifying channel occupation time described above is provided, wherein the device is located at the user equipment.

Those skilled in the art can understand that a part or all of the methods described in the embodiments of the present disclosure can be performed by a computer program instructing a related hardware. The computer program can be stored in a computer-readable storage medium, and when the computer program is executed, the computer program can include processes of the foregoing methods described in the embodiment. The storage medium may be a magnetic disk, an optical disk, a Read-Only Memory (ROM), or a Random Access Memory (RAM), etc.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for notifying channel occupation time, wherein the method applies to a base station, comprising:
    in an unlicensed spectrum, performing Listen-Before-Talk (LBT) and conducting channel access; and
    based on accessing a channel successfully, sending a time slot format information which indicates one or more time slots of one or more cells to a User Equipment (UE) through a Physical Downlink Control Channel (PDCCH), so as to notify the UE that the base station accesses the channel and occupies the channel,
    wherein based on a transmission period of the PDCCH or an absolute time corresponding to a number of time slot formats indicating a corresponding cell in the POOCH being less than or equal to a current maximum channel occupation time, the time slot format information in the PDCCH comprises channel occupation information, so that the UE performs downlink reception, uplink transmission or channel access in symbols of each time slot based on the channel occupation information, wherein the UE performing downlink reception, uplink transmission or channel access in symbols of each time slot based on the channel occupation information comprises: in uplink symbols indicating time slot format, the UE performing channel access according to Type 2 channel access process, or sending an uplink channel or signal directly without performing LBT.

2. The method according to claim 1, wherein sending a time slot format information which indicates one or more time slots of one or more cells to a UE through a PDCCH comprises:
    sending the time slot format information which indicates one or more time slots of one or more cells to the UE through Downlink Control Information (DCI) 2-0 of the PDCCH.

3. The method according to claim 1, wherein performing LBT and conducting channel access comprises: conducting channel access according to Type 1.

4. The method according to claim 3, wherein if based on the transmission period of the PDCCH or the absolute time corresponding to the number of time slot formats indicating a corresponding cell in the PDCCH being greater than the current maximum channel occupation time; the time slot format information in the PDCCH comprises channel occupation information and channel release information.

5. The method according to claim 4, wherein the channel release information comprises: based on a length of the absolute time corresponding to the number of time slot formats in the PDCCH indicating a corresponding cell exceeding the maximum channel occupation time, using a specific time slot format to indicate that the maximum channel occupation time is exceeded or channel release.

6. The method according to claim 1, wherein the channel occupation information comprises: based on an absolute time corresponding to a number of all time slot formats indicating a corresponding cell in the PDCCH being less than or equal to the maximum channel occupation time, or an absolute time corresponding to a number of partial time slot formats indicating a corresponding cell being less than or equal to the maximum channel occupation time, using a specific time slot format to indicate it is within the maximum channel occupation time or channel occupation.

7. The method according to claim 6, wherein using a specific time slot format to indicate it is within the maximum channel occupation time or channel occupation comprises:
using all D to indicate that the channel is occupied in an entire time slot, the base station sends downlink data in the entire time slot, and the UE needs to receive;
using all U to indicate that the channel is occupied in the entire time slot and the UE can send uplink data in the entire time slot;
in a switching point, using D+X+U or X+U to indicate that the channel is occupied in the entire time slot, wherein the UE can send uplink data on an uplink symbol, send downlink data on a downlink symbol, and perform channel access on an X symbol; and
in two switching points, indicating that the channel is occupied in the entire time slot, wherein the UE can send uplink data on an uplink symbol, send downlink data on a downlink symbol, and perform channel access on an X symbol.

8. The method according to claim 6, wherein using a specific time slot format to indicate that the maximum channel occupation time is exceeded or channel release comprises:
using all X to indicate that the maximum channel occupation time is exceeded or channel release in the entire time slot;
using DL+X to indicate that the maximum channel occupation time is exceeded or channel release in some time slots; and
using all X to indicate that a corresponding cell has not been accessed successfully or the channel is released.

9. A method for notifying channel occupation time, wherein the method applies to a user equipment, comprising:
in an unlicensed spectrum, receiving a time slot format information sent by a base station through a Physical Downlink Control Channel (PDCCH) after the base station accesses a channel successfully, wherein the time slot format information indicates one or more time slots of one or more cells;
acquiring channel occupation information based on the slot format information; and
performing downlink reception, uplink transmission or channel access in symbols of each time slot based on the channel occupation information, wherein performing downlink reception, uplink transmission or channel access in symbols of each time slot based on the channel occupation information comprises: in uplink symbols indicating time slot format, performing channel access according to Type 2 channel access process, or sending an uplink channel or signal directly without performing Listen-Before-Talk (LBT).

10. The method according to claim 9, wherein acquiring channel occupation information comprises: acquiring at least one of the following information: whether the base station accesses the channel successfully or not, a length of channel occupation time, a timing for channel release, and an allocation information of downlink symbols and uplink symbols in each time slot during the channel occupation time.

11. The method according to claim 10, wherein performing downlink reception, uplink transmission or channel access in symbols of each time slot based on the channel occupation information comprises: receiving a downlink signal or channel in downlink symbols indicating time slot format.

12. The method according to claim 10, wherein performing downlink reception, uplink transmission or channel access in symbols of each time slot based on the channel occupation information comprises: in the uplink symbols and flexible symbols indicating time slot format, performing channel access according to Type 2 channel access process, or sending a dynamic uplink channel or signal triggered by a physical layer signaling directly without performing LBT.

13. A device for notifying channel occupation time, wherein the device is located at a base station, comprising:
an access unit, configured to perform Listen-Before-Talk (LBT) and conduct channel access in an unlicensed spectrum; and
a transmission unit, based on the access unit accessing a channel successfully, configured to send a slot format information which indicates one or more time slots of one or more cells to a User Equipment (UE) through a Physical Downlink Control Channel (PDCCH), so as to notify the UE that the base station accesses the channel and occupies the channel,
wherein based on a transmission period of the POOCH or an absolute time corresponding to a number of time slot formats indicating a corresponding cell in the PDCCH being less than or equal to a current maximum channel occupation time, the time slot format information in the PDCCH comprises channel occupation information, so that the UE performs downlink reception, uplink transmission or channel access in symbols of each time slot based on the channel occupation information, wherein the UE performing downlink reception, uplink transmission or channel access in symbols of each time slot based on the channel occupation information comprises: in uplink symbols indicating time slot format, the UE performing channel access according to Type 2 channel access process, or sending an uplink channel or signal directly without performing LBT.

14. The device according to claim 13, wherein the access unit performs channel access according to Type 1.

15. The device according to claim 14, wherein based on the transmission period of the PDCCH or the absolute time corresponding to the number of time slot formats indicating a corresponding cell in the PDCCH being greater than the current maximum channel occupation time, the time slot format information in the PDCCH comprises channel occupation information and channel release information.

16. The device according to claim 15, wherein the channel release information comprises: based on a length of the absolute time corresponding to the number of time slot formats in the PDCCH indicating a corresponding cell exceeding the maximum channel occupation time, using a specific time slot format to indicate that the maximum channel occupation time is exceeded or channel release.

17. The device according to claim 16, wherein using a specific time slot format to indicate that the maximum channel occupation time is exceeded or channel release comprises:
  using all X to indicate that the maximum channel occupation time is exceeded or channel release in the entire time slot;
  using DL+X to indicate that the maximum channel occupation time is exceeded or channel release in some time slots; and
  using all X to indicate that a corresponding cell has not been accessed successfully or the channel is released.

18. The device according to claim 13, wherein the channel occupation information comprises: based on an absolute time corresponding to a number of all time slot formats indicating a corresponding cell in the PDCCH being less than or equal to the maximum channel occupation time, or an absolute time corresponding to a number of partial time slot formats indicating a corresponding cell being less than or equal to the maximum channel occupation time, using a specific time slot format to indicate it is within the maximum channel occupation time or channel occupation.

19. The device according to claim 18, wherein using a specific time slot format to indicate it is within the maximum channel occupation time or channel occupation comprises:
  using all D to indicate that the channel is occupied in an entire time slot, the base station sends downlink data in the entire time slot, and the UE needs to receive;
  using all U to indicate that the channel is occupied in the entire time slot and the UE can send uplink data in the entire time slot;
  in a switching point, using D+X+U or X+U to indicate that the channel is occupied in the entire time slot, wherein the UE can send uplink data on an uplink symbol, send downlink data on a downlink symbol, and perform channel access on an X symbol; and
  in two switching points, indicating that the channel is occupied in the entire time slot, wherein the UE can send uplink data on an uplink symbol, send downlink data on a downlink symbol, and perform channel access on an X symbol.

* * * * *